United States Patent Office 3,394,305
Patented July 23, 1968

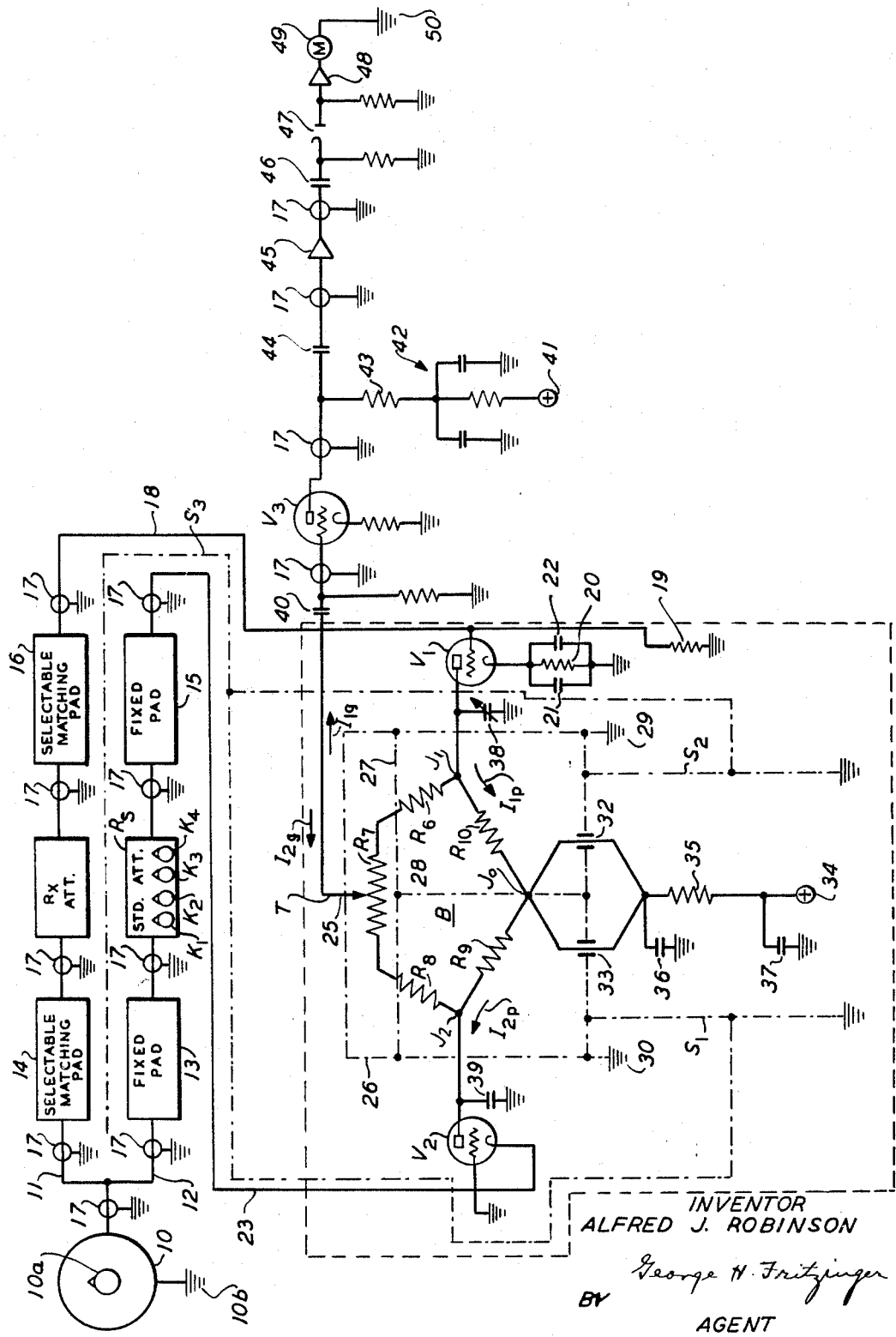

3,394,305
SYSTEM FOR CALIBRATING UNKNOWN RF ATTENUATOR BY MEANS OF STANDARD ATTENUATOR AND NULL DETECTOR BRIDGE
Alfred J. Robinson, New Providence, N.J., assignor to McGraw-Edison Company, Elgin, Ill., a corporation of Delaware
Filed May 11, 1965, Ser. No. 454,822
4 Claims. (Cl. 324—57)

ABSTRACT OF THE DISCLOSURE

An electrical system for calibrating an unknown RF attenuator over a wide frequency range comprises a variable-frequency source of voltage modulated at a low frequency, a standard attenuator, a null detector bridge, and means for feeding A.C. currents from said source via the unknown and standard attenuators through RF vacuum tubes to opposite ends of the bridge wherein one of the tubes is connected to produce a 180° phase shift relative to the other. The plate resistors of the tubes comprise two arms of one branch of the bridge. The junction between these arms is connected to a B-plus source of voltage and is grounded as to A.C. voltage. The other branch of the bridge includes a resistance with a variable tap which is set to balance the attenuator. The tap is connected via an amplifier and detector to a meter for indicating when the two currents fed to the bridge are in balance. R.F. components and balanced shielding are employed to enable the calibration to be carried out in the megacycle range.

---

An object of the invention is to provide a wide band null detector of the character described which is simple to construct and to operate.

Another object is to provide a null detector which is operable over a frequency range from 50 kilocycles to 25 megacycles without loss of sensitivity and without need to change or switch any of the components.

A feature of the invention lies in the use of impedance elements in the null bridge which are essentially resistive beyond 100 megacycles and in the use of triode electron tubes which have a low plate resistance and an essentially fixed gain up to 200 megacycles.

These and other objects and features of the invention will be apparent from the following description and the appended claims.

In the description of the invention reference is had to the accompanying drawing showing a schematic circuit diagram of an apparatus for measuring and calibrating attenuators over a wide frequency range in accordance with the invention.

In the schematic circuit diagram there is provided a signal source 10 of from 50 kilocycles to 100 megacycles variable as by a control knob 10a. The source is modulated 100 percent at a suitable audio frequency, say 1000 c.p.s. This source may, for example, have an internal resistance of 50 ohms and be grounded at 10b. The source 10 feeds into two parallel arms or circuits 11 and 12 of which the circuit 11 contains an unknown attenuator $R_x$ to be measured and calibrated and the circuit 12 contains a standard attenuator $R_s$. As typical values, these attenuators may each have input and output resistances of 75 ohms. Accordingly, between the source 10 and standard attenuator there is a fixed impedance matching pad 13 and between the source 10 and the unknown attenuator $R_x$ is an impedance matching pad 14 which is however made variable so that the measuring apparatus may accommodate attenuators having different input impedances. In matching a 50 ohm resistance source to a 75 ohm load each of the pads 13 and 14 have insertion losses of approximately 7 db. Following the attenuators $R_s$ and $R_x$ are respective impedance matching pads 15 and 16. Here again, the pad 15 is fixed and the pad 16 is variable to accommodate attenuators $R_x$ having different output resistances. All of the matching pads may comprise resistance pi-type networks. All resistors are non-inductive and non-capacitive so that the pads have essentially pure input and output resistances throughout the frequency range. All connections are made by coaxial leads having grounded shields 17 as indicated. The standard attenuator $R_s$ has four controls $K_1$ to $K_4$ of which the first may have db graduations from .01 to .1, the second from .1 to 1, the third from 1 to 15 and the fourth from 10 to 40 db.

The signal from the variable parallel circuit 11 is fed by lead 18 across a load resistor 19 and into the grid of a tube $V_1$ operated Class A. The cathode of the tube $V_1$ is connected to ground through a bias resistor 20 which is bypassed by a low frequency electrolytic capacitor 21 and by a high frequency capacitor 22. The plate of the tube $V_1$ is connected through a plate load resistor $R_{10}$ typically 500 ohms which forms one arm of a resistance Wheatstone bridge or balancing network B. The tube $V_1$ serves to shift the signal 180° from the circuit 11 to the balancing network B.

The signal from the fixed circuit 12 is fed by a lead 23 to the cathode of a tube $V_2$. The grid of the tube $V_2$ is connected to ground with proper bias for the tube being developed by the output resistance of the fixed pad 15. The plate of the tube $V_2$ is connected through a plate load resistor $R_9$ also typically of 500 ohms which forms a second arm of the balancing network B. The tube $V_2$ is operated thus as a grounded grid amplifier. The tubes $V_1$ and $V_2$ are both preferably of the ceramic type having low plate resistance and stable gain through a high frequency range to 200 megacycles, as aforementioned. Electronic tubes especially suitable for this application are the General Electric tubes No. 7296. Although the tube $V_1$ is utilized to produce a 180° phase shift and the tube $V_2$ is used to produce no phase shift, the two tubes are operated so as to have similar gain characteristics.

Paralleling the series connection of bridge resistors $R_9$ and $R_{10}$ is a series connection of resistors $R_8$, $R_7$ and $R_6$ in the order named of which the resistors $R_8$ and $R_6$ are fixed resistors having typically 375 ohms each and the resistor $R_7$ is a rheostat of 250 ohms provided with a variable tap 25. The rheostat $R_7$ is provided to balance the network B and is normally set at or near its mid point. Thus, the resistor $R_8$ and one-half of the resistor $R_7$ form a third arm of the network B and the resistor $R_6$ and one-half of the resistor $R_7$ form a fourth arm of the network B. Each of the third and fourth arms of the network B therefore also has nominally 500 ohms.

The entire network B is housed in a shield can 26 which has a partition wall 27 enclosing the rheostat $R_7$ and another partition wall 28 separating the resistors $R_8$ and $R_9$ from the resistors $R_6$ and $R_{10}$. This shield can has symmetrical grounds at 29 and 30 and is connected at its midpoint to a junction $J_0$ between the plate load resistors $R_9$ and $R_{10}$. The junction $J_0$ is connected via parallel wires which lead out of the shield can 26 through feed-through type capacitors 32 and 33. These capacitors are connected to symmetrical grounds 29 and 30 and function as high frequency by-passes. The parallel wires are joined at the outer sides of the capacitors 32 and 33 and are connected to a 200 volt D.C. power source 34 through a pi-type decoupling network comprising a series resistor 35 and parallel capacitors 36 and 37. The decoupling network 35–37 is enclosed by symmetrical shield walls $S_1$ and $S_2$, and these walls are connected to a shield $S_3$ which separates the variable and fixed circuits 11 and 12 as well as the respective lead lines 18 and 23.

A variable capacitor 38 is connected from ground to the junction $J_1$ between the bridge resistors $R_6$ and $R_{10}$, and a fixed capacitor 39 is connected from ground to the junction $J_2$ between the bridge resistors $R_8$ and $R_9$. The capacitor 38 is used to correct slight extraneous phase shifts and the capacitor 39 is made approximately equal to the minimum capacity of the capacitor 38. The capacitor 38 is required to obtain electrical symmetry at the higher frequencies.

When the network B is fully balanced, the two signals from the variable and fixed circuits 11 and 12 will have equal magnitude and opposite phase across the opposite sides of the rheostat $R_7$ with the result that the tap 25 will be at a null or zero potential. For determining when a null point is reached the tap 25 is connected through a coupling condenser 40 to the grid of a tube $V_3$ also of the ceramic type abovementioned. The tube $V_3$ is operated Class A and serves to isolate the bridge circuit. The plate of the tube $V_3$ is connected to a D.C. source 41 through a decoupling network 42 and plate resistor 43. The plate of the tube $V_3$ is also coupled through a condenser 44 to an amplifier 45. The amplifier 45 is connected through a condenser 46 to a detector 47. An audio amplifier 48 provided with suitable high frequency by-pass circuits is connected to the output of the detector 47. The output of the audio amplifier 48 is connected through an A.C. meter or cathode ray scope 49 to ground 50.

As further typical values, the resistor 20 may have 75 ohms, the capacitor 21, 6 microfarads; the capacitor 22, .068 microfarad; the capacitors 32 and 33, .001 microfarad each; the resistor 35, 220 ohms; the capacitors 36 and 37, 60 microfarads each; the capacitor 39, 2 mmfd.; and the voltage sources 34 and 41, 200 volts each.

The operation of the null detector is as follows: As the standard attenuator $R_s$ is adjusted to the same db loss as is present in the unknown $R_x$ attenuator the two A.C. signals fed to the balancing network B via the tubes $V_1$ and $V_2$ approach equality but in a 180° out-of-phase relationship. The reference A.C. potential in the balancing network is that at the junction $J_0$—which remains at zero potential because this junction point is grounded on an A.C. basis by the large capacitor 36. When the signal currents to the tubes $V_1$ and $V_2$ are equal the plate current component $I_{1p}$ from the tube $V_1$ and the plate current component $I_{2p}$ from the tube $V_2$ will set up respective current components $I_{1g}$ and $I_{2g}$ via the tap T to the tube $V_3$ which are equal and opposite in phase to give a null indication in the output circuit.

In carrying out a calibrating operation, the user connects the unknown $R_x$ attenuator in the circuit 11 and sets the matching pads 14 and 16 to match the input and output resistances of the unknown attenuator. Next he adjusts the controls of the standard attenuator $R_s$ until a zero reading is obtained on the meter or scope 49 at each frequency at which the $R_x$ attenuator is checked. These checks will be made at suitable frequency intervals in the range from 50 kilocycles to 25 megacycles. A table or plot of these readings against the respective frequencies forms a measurement or calibration of the unknown attenuator. It is to be understood, however, that other electrical devices such as capacitors or inductors may be calibrated in a similar manner against calibrated variable standards of such electrical impedances.

The embodiment of my invention herein particularly shown and described is intended to be illustrative and not necessarily limitative of my invention since the same is subject to changes and modifications without departure from the scope of my invention, which I endeavor to express according to the following claims.

I claim:
1. A null detector comprising an A.C. balancing network having two branches connected in parallel, first and second signal input circuits connected to opposite ends of said branches, means for feeding respective A.C. signals whose amplitudes are to be compared to said signal input circuits, one of said signal input circuits including an electronic amplifier device connected to produce a 180° phase shift and the other of said circuits including an electronic amplifier device connected to produce a zero phase shift, one of said branches having two serially connected resistors respectively operating as load resistors to said device, a D.C. source of voltage connected to the junction between said load resistors, means for grounding the junction between said load resistors as to A.C. currents, the second of said branches including a resistance having a variable tap and further means grounding said tap as to A.C. currents, said tap being adjusted to a zero A.C. potential as to ground for an initial condition of said input signals being the same amplitude, and an output circuit leading from said tap to ground including an amplifier and an indicator means.

2. The null detector circuit set forth in claim 1 including a source of alternating current of a frequency variable into the radio frequency range, means for modulating said source at an audio frequency, an unknown attenuator to be calibrated, a calibrated variable attenuator, means connecting said source via respective impedance matching pads to the inputs of said attenuators, means connecting said first and second signal input circuits via respective impedance matching pads to the outputs of said attenuators, means for varying the frequency of said source, and means for varying said calibrated attenuator at each frequency of said source to bring the reading of said indicator means to a minimum.

3. The null detector set forth in claim 2 wherein both of said amplifier devices are ceramic type triodes having high mutual conductance and low plate resistance, means connecting one of said amplifier triodes in Class A arrangement to produce a 180° phase shift, means connecting the other of said amplifier triodes with a grounded grid to produce a zero phase shift, both of said amplifier triodes having substantially the same gain characteristics.

4. The null detector set forth in claim 2 wherein said resistors in said one branch have equal values of essentially pure resistance, said second branch has an essentially pure resistance and said tap is adjusted to a mid point in said second branch, said matching pads at the input and output of said unknown attenuator having respectively the same insertion losses as the matching pads at the input and output of said calibrated attenuator and said amplifier devices having substantially the same gain characteristics whereby said null detector is electrically balanced with respect to the junction point between said two resistors in said one branch.

References Cited
UNITED STATES PATENTS

| | | | |
|---|---|---|---|
| 2,457,165 | 12/1948 | McNamee | 323—75 |
| 2,672,588 | 3/1954 | Vanous | 324—140 XR |
| 2,762,978 | 9/1956 | Norton | 324—140 |
| 3,085,194 | 4/1963 | Revesz | 323—75 |

RUDOLPH V. ROLINEC, *Primary Examiner.*

E. E. KUBASIEWICZ, *Assistant Examiner.*